(12) United States Patent
Smith

(10) Patent No.: US 8,951,101 B2
(45) Date of Patent: Feb. 10, 2015

(54) DEBONING MACHINE AUGER MOUNT ASSEMBLY

(71) Applicant: Weiler and Company, Inc., Whitewater, WI (US)

(72) Inventor: Marshall D. Smith, Riverton, UT (US)

(73) Assignee: Weiler and Company, Inc., Whitewater, WI (US)

( * ) Notice: Subject to any disclaimer, the term of this patent is extended or adjusted under 35 U.S.C. 154(b) by 192 days.

(21) Appl. No.: 13/764,973

(22) Filed: Feb. 12, 2013

(65) Prior Publication Data

US 2013/0206882 A1    Aug. 15, 2013

Related U.S. Application Data

(60) Provisional application No. 61/598,006, filed on Feb. 13, 2012.

(51) Int. Cl.
*A22C 17/04*    (2006.01)
*G01B 5/14*    (2006.01)

(52) U.S. Cl.
CPC .. *A22C 17/04* (2013.01); *G01B 5/14* (2013.01)
USPC ........................................................ 452/138

(58) Field of Classification Search
USPC .................................. 452/135, 138
See application file for complete search history.

(56) References Cited

U.S. PATENT DOCUMENTS

| | | | |
|---|---|---|---|
| 2,322,791 A | 6/1943 | De Back | |
| 4,042,176 A | 8/1977 | Beck et al. | |
| 4,189,104 A | 2/1980 | dos Santos | |
| 4,685,626 A * | 8/1987 | Kerdiles et al. | 241/74 |
| 5,213,541 A * | 5/1993 | Richburg et al. | 452/135 |
| 5,749,776 A * | 5/1998 | Evans | 452/138 |
| 5,813,909 A | 9/1998 | Goldston | |
| 5,830,305 A * | 11/1998 | Andersen et al. | 156/242 |
| 7,922,567 B2 * | 4/2011 | Gulak | 452/138 |

FOREIGN PATENT DOCUMENTS

FR    2542575    9/1984

OTHER PUBLICATIONS

United States International Searching Authority, International Search Report and Written Opinion for PCT/US2013/025947 dated Apr. 19, 2013, 6 pages.

\* cited by examiner

*Primary Examiner* — Richard Price, Jr.
(74) *Attorney, Agent, or Firm* — Klintworth & Rozenblat IP LLC

(57) ABSTRACT

Deboning machines and methods of operating deboning machines are provided. In one aspect, a deboning machine includes a housing, a bearing supported by the housing, a separation chamber supported by the housing and including perforations defined through the separation chamber from an interior surface to an exterior surface, an auger including a shaft and a flute formed about the shaft with the auger extending through the separation chamber and the flute adapted to be positioned a working distance from the interior surface of the separation chamber. The deboning machine also includes a retainer rotatably supported by the bearing with the auger extending through the retainer, a nut rotatably coupled to a threaded portion of the auger and rotation of the moves the flute relative to the separation chamber to establish the working distance between the flute and the interior surface of the separation chamber.

17 Claims, 6 Drawing Sheets

DEBONING MACHINE AUGER MOUNT ASSEMBLY

RELATED APPLICATIONS

The present application claims the benefit of U.S. Provisional Patent Application No. 61/598,006, filed Feb. 13, 2012, the entire contents of which is incorporated herein by reference.

FIELD OF THE INVENTION

The present disclosure relates generally to machines for deboning or separating meats, such as red meat, pork, poultry and fish, from bone, cartilage or sinew. More particularly, the present disclosure relates to an auger mount assembly and method for attaining a desired separation or working spacing between an outer radial surface of an auger and a radially interior facing surface of a separation chamber that is concentrically oriented about the auger.

BACKGROUND

Conventional deboning machines are disclosed in Applicant's U.S. Pat. Nos. 4,189,104 and 5,813,909; the disclosures of which are incorporated herein by reference. Conventional deboning machines may have difficulty establishing and maintaining acceptable working space between an auger and an interior surface of a separation chamber.

SUMMARY

In one aspect, a deboning machine is provided and includes a housing, a bearing supported by the housing, a separation chamber supported by the housing and including a plurality of perforations defined through the separation chamber from an interior surface to an exterior surface, an auger including a shaft and a flute formed about the shaft, wherein the auger extends through the separation chamber and the flute is adapted to be positioned a working distance from the interior surface of the separation chamber, a retainer rotatably supported by the bearing, wherein the auger extends through the retainer, a nut rotatably coupled to a threaded portion of the auger, wherein rotation of the nut moves the flute relative to the separation chamber to establish the working distance between the flute and the interior surface of the separation chamber, and at least one fastener coupling the nut to the retainer.

In another aspect, a method of setting a working spacing between an auger and a separation chamber in a deboning machine is provided. The method includes passing a threaded portion of the auger through a retainer that rotationally cooperates with a bearing, engaging a nut with the threaded portion of the auger, coupling the nut to the retainer, rotating the nut and the retainer to move the auger relative to the retainer in a first longitudinal direction until the auger engages the separation chamber, and moving the auger in a second longitudinal direction opposite the first longitudinal direction relative to the retainer to attain the working spacing between the auger and the separation chamber.

The scope of the present invention is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the invention.

DETAILED DESCRIPTION

Figure 1:
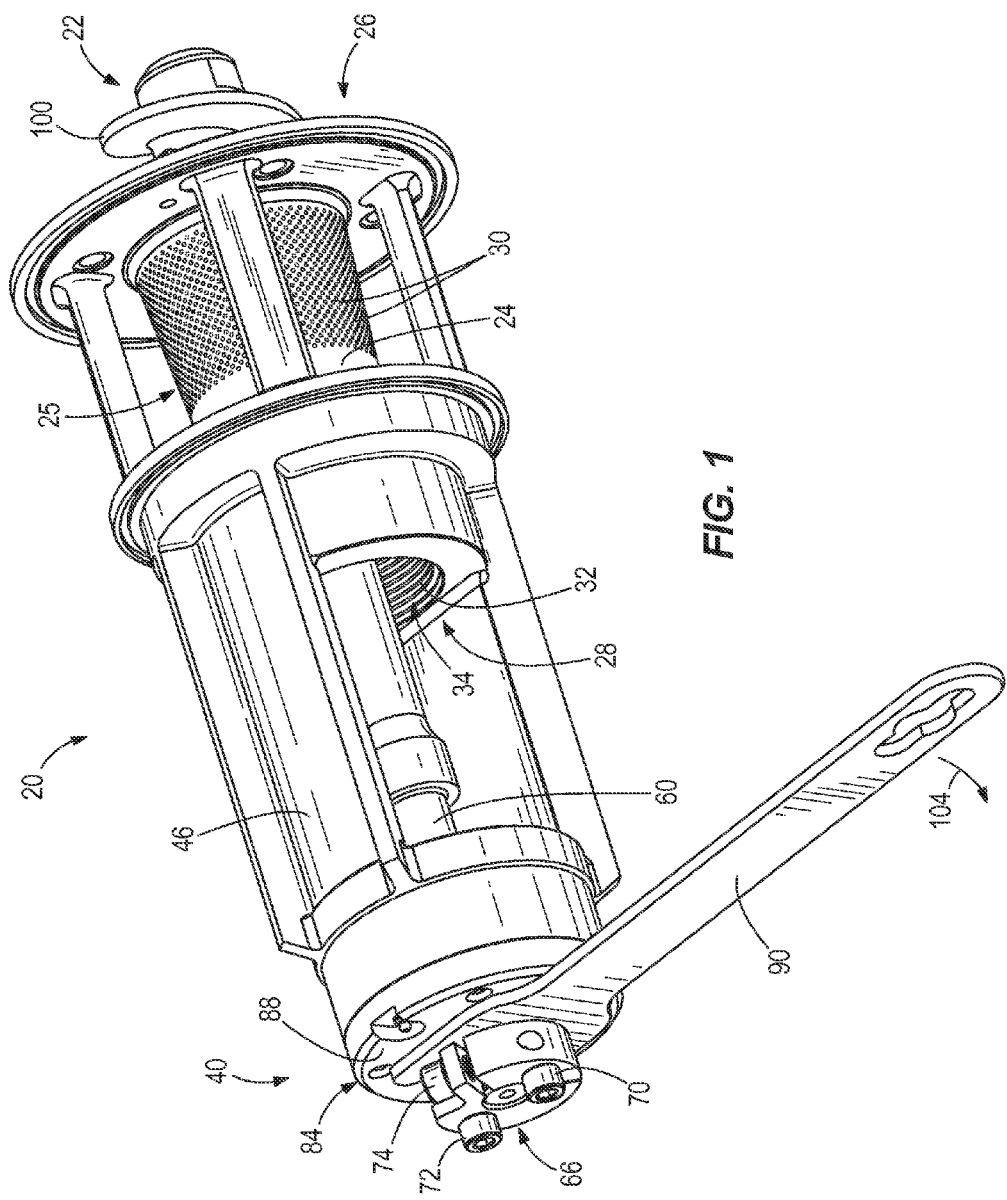
FIG. 1 is a top, front perspective view of an exemplary deboning machine.
Figure 2:
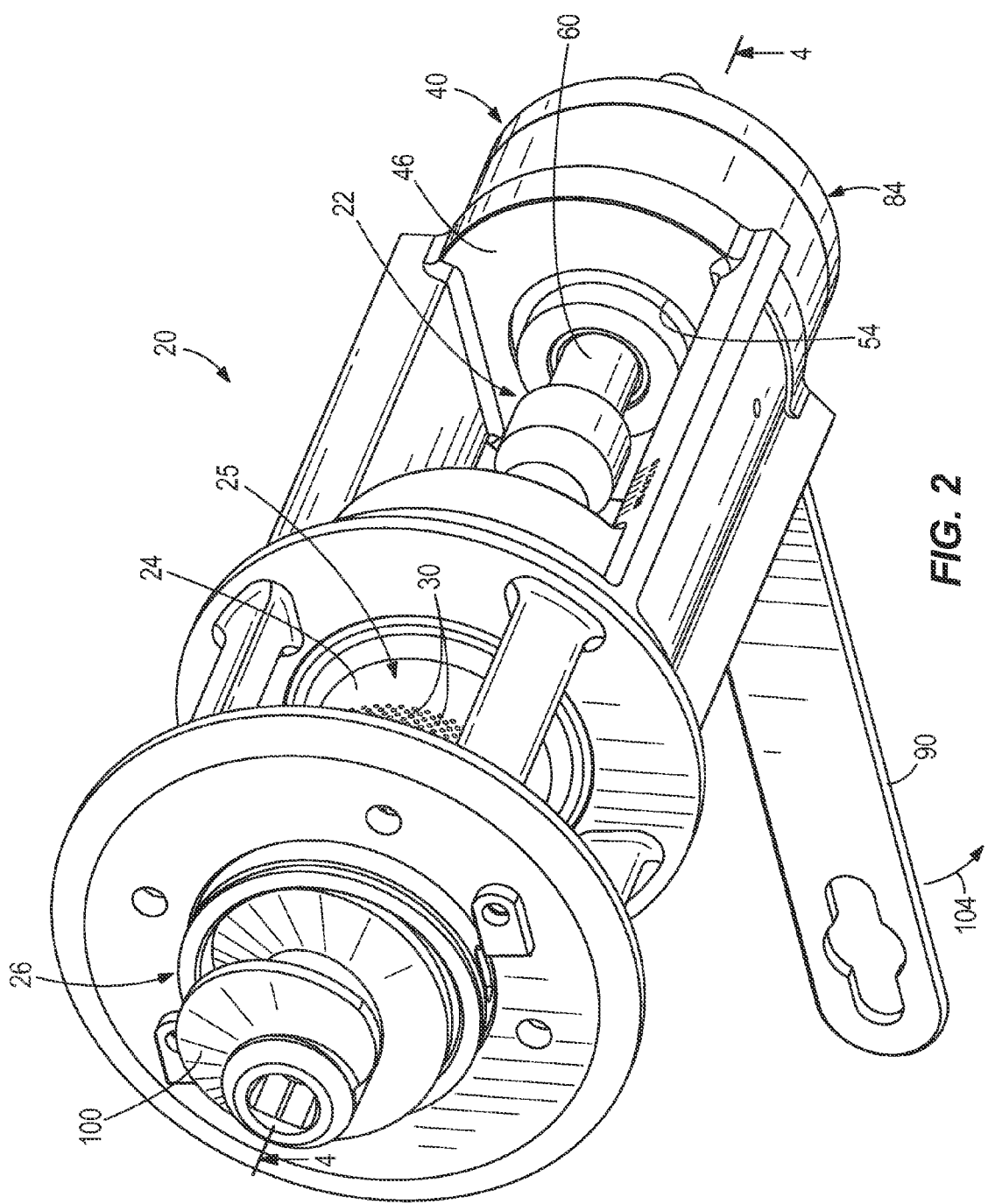
FIG. 2 is a bottom, rear perspective view of the deboning machine illustrated in FIG. 1.

As shown in FIGS. 1 and 2, an exemplary deboning machine 20 is illustrated and includes a compression type conveyor screw or auger 22 that operates in close proximity to a perforated frusto-conical body 24 defined as a separation chamber 25. Bone connected meat is communicated from a feed end 26 of the machine 20 to a bone discharge end 28 of the machine 20. Separation chamber 25 includes a number of perforations 30 defined in a circumferential wall of the body 24. As rotation of auger 22 moves meat and bone material through body 24 toward discharge end 28, meat separated from the bone material passes radially through the perforations 30 in body 24 and the remaining bone material is dispelled from machine 20 proximate bone discharge end 28 of machine 20. A valve ring may surround the auger 22 and engage a threaded surface 32 (FIGS. 1, 3, and 4) defined by a head frame member 34. The valve ring creates a back pressure to provide a choke for controlling pressure within the separation chamber 25, thereby controlling extrusion through the perforations 30 of the chamber 25 of the separated meat. It is further appreciated that the perforations 30 associated with the separation chamber 25 can be manipulated to be provided in different patterns, sizes, shapes, and/or frequency to provide variable operating pressures along a longitudinal length of the separation chamber 25 and to alter the separation performance of machine 20.

The separation chamber 25 is typically of machined heavy duty steel for withstanding the high pressures associated with the deboning operation. The perforations 30 extend between radial inner and outer surfaces of the chamber wall, and present a plurality of sharp arcuate edges which, in cooperation with the fluted turns of the auger 22, function to strip the meat from its bone as the bone connected meat is moved progressively by the turns of the auger 22 from the feed end 26 to the bone discharge end 28. Accurate and controllable spacing between the auger 22 and the separation chamber 25 is necessary to attain proper or desired processing of the raw materials to attain a desired finish material content and consistency. Accurate and controllable spacing also reduces premature and/or undesired wear of the auger 22 and/or the separation chamber 25, with such wear being attributable to improper spacing between the auger 22 and the separation chamber 25.

Commonly, during the service life of the auger 22 and/or the separation chamber 25, it is periodically necessary to adjust the spacing between the auger 22 and the separation chamber 25 to maintain the desired characteristics of the finished product. As the auger 22 and the separation chamber 25 are commonly provided in concentrically oriented frusto-conical shapes, lateral translation of the auger 22, or translation of the auger 22 in a direction aligned with a longitudinal axis 48 (see FIG. 4) of the auger 22, relative to the concentrically positioned separation chamber 25 provides a uniform spacing along the longitudinal interface between the auger 22 and the separation chamber 25. There is presently a demand for an adjustment assembly for manipulating the position of the auger 22 relative to the separation chamber 25 that is convenient to use, easy to adjust, and provides repeatable positioning of the auger 22 relative to the separation chamber 25.

Referring to FIGS. 1-6, machine 20 includes an auger mount assembly 40 that supports one end 44 of auger 22 relative to a support housing or head 46 of machine 20. Mount assembly 40 includes one or more bearings 50, 52 that cooperate with an opening 54 formed in head 46. A retainer 56 extends longitudinally through and is supported by bearings 50, 52 and cooperates with the opening 54 so as to fix the longitudinal position of retainer 56 relative to head 46. A longitudinal opening 58 is formed through retainer 56 and shaped to slidably cooperate with a shaft portion 60 of auger 22. A threaded section 62 is formed along shaft portion 60 of auger 22 near end 44. Shaft portion 60 of auger 22 extends beyond an outboard directed end face 64 of retainer 56 and operatively cooperates with a nut 66 that can be engaged therewith.

A number of fasteners or bolts 70, 72, 74 (FIG. 2) cooperate with nut 66. Fasteners 70, 72 pass through respective openings 76, 78 defined in nut 66 and engage respective corresponding cavities 80, 82 defined in an outboard directed end face 64 of retainer 56. Fastener 74 is oriented in a transverse direction relative to the longitudinal axis 48 of the auger 22 and longitudinal axes of fasteners 70, 72, and cooperates with nut 66, but does not otherwise interfere with or engage retainer 54. As explained further below, fastener 74 provides a first manner of temporarily fixing the orientation of nut 66 such that nut 66 cannot rotate relative to auger 22.

A thrust plate 84 is secured to head 46 and fixes the lateral orientation of retainer 56 relative to head 46. Retainer 56 is allowed to rotate relative to head 46, but, with respect to the direction of the longitudinal axis 48 of auger 22, the retainer 56 is positionally fixed with respect to head 46. Retainer 56 includes a tool lip 86 that extends beyond an outboard facing sidewall 88 of thrust plate 84. Tool lip 86 is constructed to operationally cooperate with a tool such as a wrench 90. As explained further below, the cooperation of a wrench 90 with retainer 56, nut 66 with retainer 56, and shaft 60 of auger 22 allows a user to repeatedly and conveniently establish a working distance or spacing, indicated by arrow 96 (FIGS. 4 and 6) between flutes 100 of auger 22 and a radially internal facing surface 102 of separator chamber 25. Preferably, working distance 96 is provided as approximately ⅛ inch although other working dimensions are envisioned.

With continued reference to FIGS. 1-6, wrench 90 is adapted to engage tool lip 86 of retainer 56 and rotate the retainer 56 relative to the head 46. The nut 66 is coupled to the retainer 56 via fasteners 70, 72 and rotates with the retainer 56. The nut 66 threads onto the threaded portion 62 of the auger 22 until the nut 66 engages the wrench 90. A space 95 is provided by a width 94 of the wrench 90 and the space 95 is between the nut 66 and the outboard facing sidewall 88 of the thrust plate 84. The wrench 90 is then removed from the tool lip 86 and the nut 66 can be further advanced onto the auger 22 an amount equal to the space 95. As explained further below, when fully assembled and configured for operation, the distance associated with space 95 allows translation of auger 22 in a lateral direction out of contact engagement with internal facing surface 102 of separation chamber 25. Said in another way, space 95 defines working distance 96 associated with the position of auger 22 relative to separation chamber 25.

During assembly of machine 20, auger 22 is introduced into separation chamber 25 from the left-hand side (as viewed in FIG. 4) such that shaft 60 passes through retainer 56, the threaded portion 62 of auger 22 extends beyond retainer 56, and the nut 66 can be engaged with the threaded portion 62 at a location outboard of thrust plate 84. Auger 22 is laterally translatable along the longitudinal axis 48 with respect to retainer 56, but is rotationally supported by the retainer 56. Retainer 56 is rotatable relative to head 46 and auger 22 via manipulation of wrench 90 so as to align nut 66 for engagement of bolts 70, 72 with openings 80, 82 of retainer 56. As mentioned above, wrench 90 has a thickness, indicated by arrow 94 (FIGS. 4 and 5) such that wrench 90 extends in an outboard direction, or a direction toward nut 66, beyond the end face 64 of retainer 56 so as to maintain space 95 between nut 66 and retainer 56 when nut 66 is loosely engaged with auger 22. As explained further below, when fully assembled, space 95 defines the working distance 96 between auger 22 and separation chamber 25.

With nut 66 loosely engaged with threaded portion 62 of auger 22, fasteners 70, 72 may be loosely engaged with retainer 56. Nut 66 may be rotated to capture wrench 90 between nut 66 and outboard facing sidewall 88 of thrust plate 84. Rotation of wrench 90, and thereby retainer 56, facilitates the alignment of fasteners 70, 72 with the respective openings 76, 78 in nut 66 and cavities 80, 82 in retainer 56. With fasteners 70, 72 loosely engaged between nut 66 and retainer 56, rotation of wrench 90 in a tightening direction, associated with arrow 104, advances nut 66 along the threads 62 of auger shaft 60 to translate auger 22 in a lateral direction, indicated by arrow 106, relative to retainer 56. Said another way, rotating the wrench 90 in the direction associated with arrow 104 rotates retainer 56 and nut 66, thereby moving the auger 22 in the direction associated with arrow 106 and into abutting engagement with surface 102 of separation chamber 25. This abutting engagement is commonly termed "bottoming out" of the auger 22 relative to the separation chamber 25.

When rotation of wrench 90 can no longer advance auger 22 in the lateral direction 106 toward surface 102 due to the contact between the auger 22 and the surface 102, machine 20 is not configured for operation as auger 22 must be backed off a desired distance from surface 102 to attain the desired working spacing 96 between the auger 22 and the surface 102 of the separation chamber 25. Operation of machine 20 requires removal of wrench 90 and the final securing of nut 66 relative to shaft 60 of auger 22 and retainer 56, and thereby the final positioning of auger 22 relative to separation chamber 25. Slight counter-directional rotation of wrench 90 from the bottomed out orientation allows wrench 90 to be disengaged from retainer 56. Once wrench 90 has been removed, tightening of bolt 74 manipulates an internal circumference of nut 66 such that nut 66 circumferentially compresses about threaded portion 62 of shaft 60 and thereby effectively fixes the positional orientation of nut 66 relative to shaft 60. However, at this stage of assembly, auger 22 has yet to attain the working orientation associated with spacing 96 as gap 95 still exists between nut 66 and retainer 56. Once nut 66 has been positionally fixed with respect to shaft 60 via tightening of fastener 74, tightening of fasteners 70, 72 moves nut 66 and auger 22 in a left-hand direction (as viewed in FIGS. 4 and 5) toward and into contact with retainer 56 a distance equal to gap 95. The dimension associated with gap 95 is translated to provide working space 96 between auger 22 and surface 102 of separation chamber 25.

Figure 3:
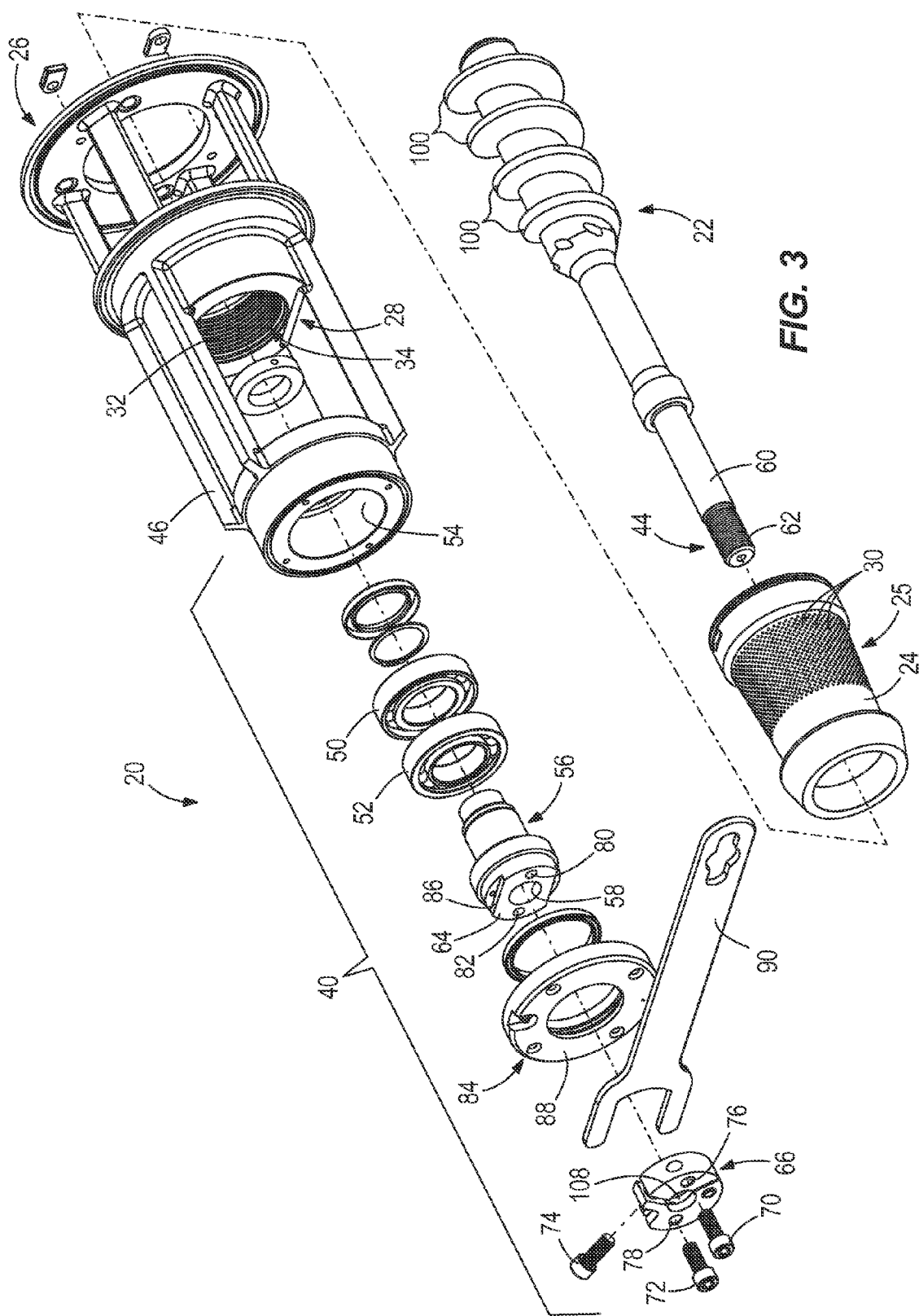
FIG. 3 is an exploded view of the deboning machine illustrated in FIG. 1.
Figure 4:
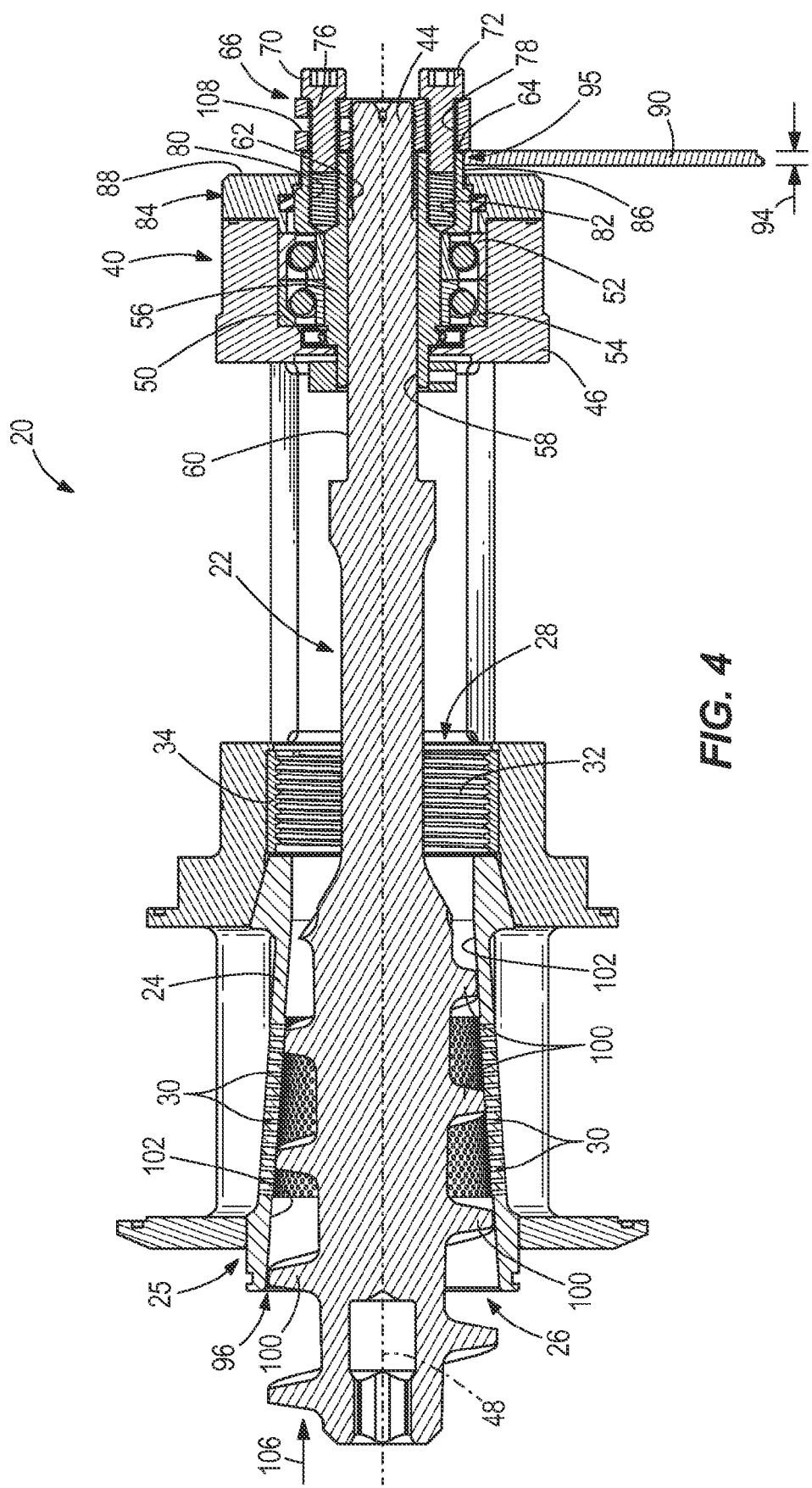
FIG. 4 is a cross-sectional view taken along line 4-4 in FIG. 2
Figure 5:
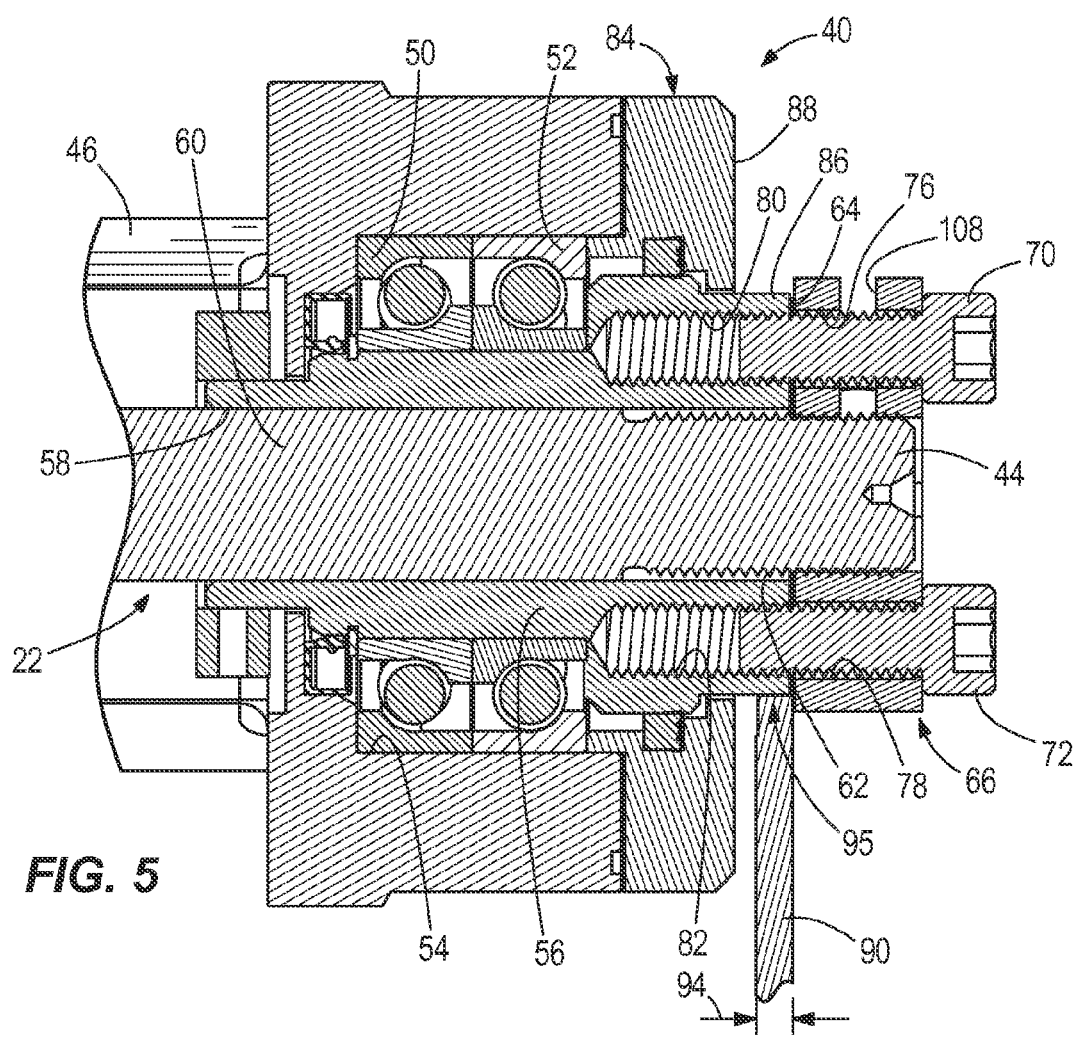
FIG. 5 is an enlarged view of a portion of the cross-sectional view of the deboning machine illustrated in FIG. 4.
Figure 6:
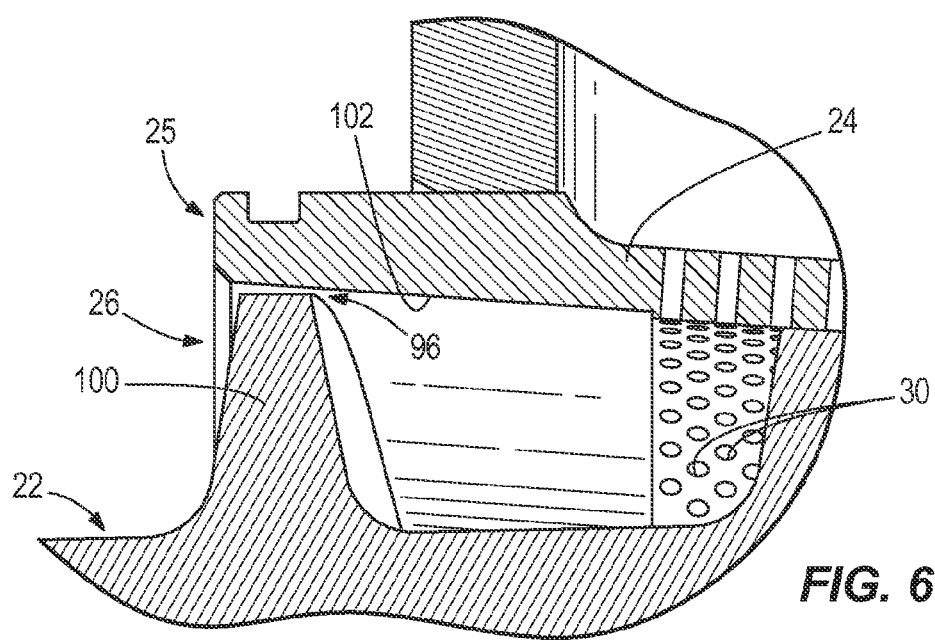
FIG. 6 is an enlarged view of another portion of the cross-sectional view of the deboning machine illustrated in FIG. 4, this view shows a working space or gap between a flight of an auger and an interior surface of a separation chamber.
Figure 7:
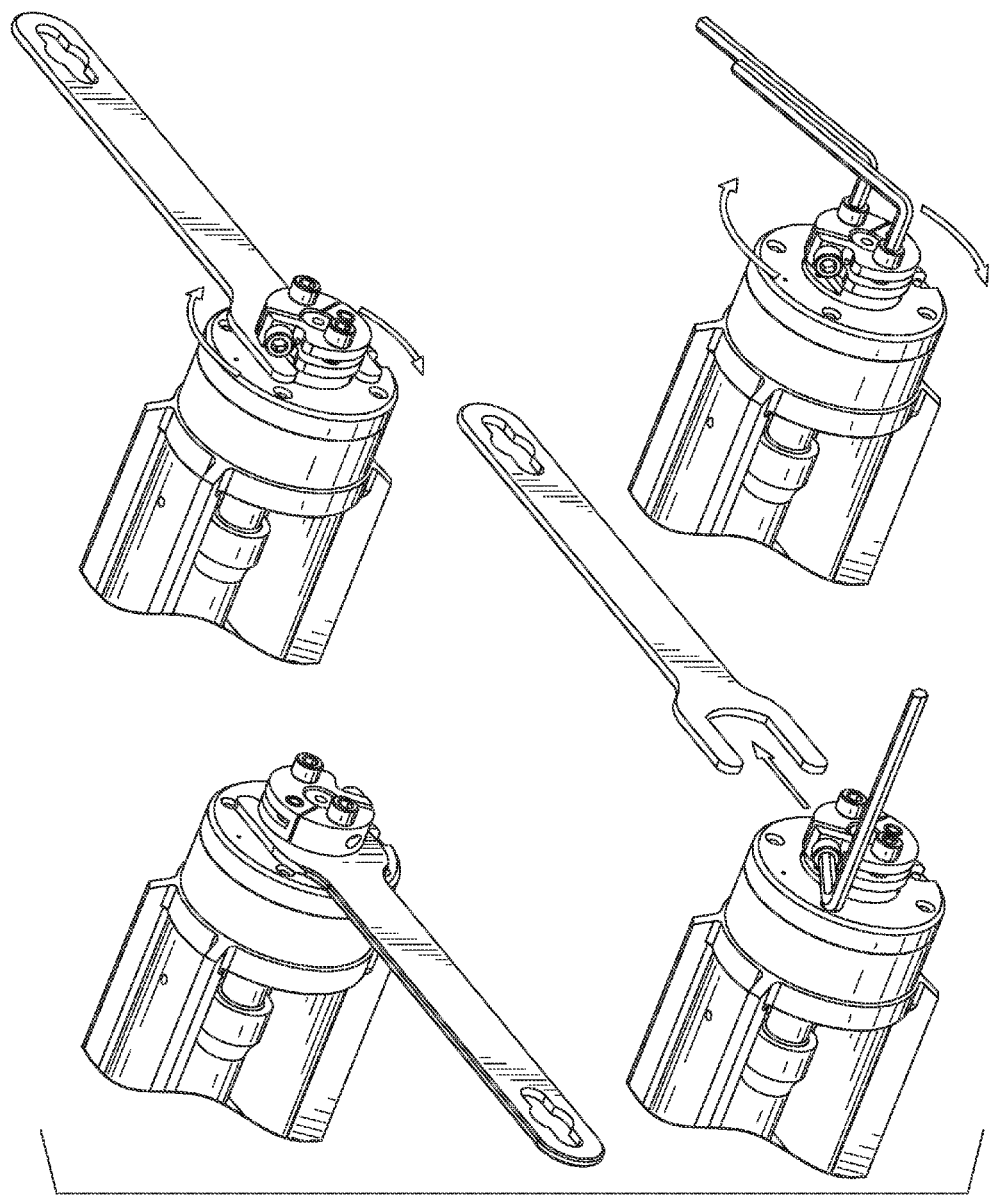
FIG. 7 illustrates an exemplary operation or process of the deboning machine illustrated in FIG. 1, this illustration may also be a graphical depiction or indicia on a tool utilized with the deboning machine.

Referring to FIGS. 3-5, a portion of nut 66 includes a slot 108 that extends in a circumferential direction around the nut 66 and at least one of the openings 76, 78 associated with receiving fasteners 70, 72 communicates with the slot 108. Initial tightening of the respective fastener 70, 72 translates nut 66 and auger 22 in a direction that moves the auger 22 out of contact engagement with surface 102 of separation chamber 25. This distance associated with gap 95 translates to the working spacing 96 between the auger 22 and the surface 102. Once nut 66 abuts retainer 56, thereby indicating that auger 22 has achieved a desired operational working spacing 96 relative to separation chamber 25, continued tightening of the respective fastener(s) 70, 72 compresses at least an outboard oriented portion of nut 66 on an outboard side of slot 108 to drive threads 120 associated with the outboard portion of the nut 66 proximate slot 108 to a position of interfering engagement with the threads 62 auger 22. Accordingly, mount assembly 40 provides two manners of resisting movement of auger 22 relative to nut 66 when the mount assembly 40 is fully assembled: (1) The compression of the nut 66 around the threaded portion 62 of the auger by tightening fastener 74; and (2) the presence of the slot 108 and the associated interference created by compressing the outboard portion of the nut 66 into the threaded portion 62 of the auger 22. In one exemplary embodiment, wrench 90 may include a graphical depiction that represents the sequential operation of nut 66, wrench 90, and fasteners 70, 72, 74. Such graphical representation may be similar to that illustrated in FIG. 7 and may include just pictures, just text, or both pictures and text.

In addition to being convenient to operate, mount assembly 40 provides an auger mounting arrangement that allows convenient adjustment of the position of the auger 22 relative to the separation chamber 25 to achieve a desired spacing therebetween. That is, it is envisioned that wrenches of different thicknesses 94 could be provided which may be configured to provide a desired working spacing 96 between the auger 22 and the separation chamber 25. Any such desired working spacing 96 may be a function of the desired operation, product yield, tolerable yield product quality, material being processed, separation chamber 25 and/or auger shape and/or construction, etc. The auger mounting arrangement provides a convenient and easy to use configuration for creating a repeatable, accurate, and desirable spacing between the auger 22 and separation chamber 25 of compression type deboning machines.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

What is claimed is:

1. A deboning machine comprising:
    a housing;
    a bearing supported by the housing;
    a separation chamber supported by the housing and including a plurality of perforations defined through the separation chamber from an interior surface to an exterior surface;
    an auger including a shaft and a flute formed about the shaft, wherein the auger extends through the separation chamber and the flute is adapted to be positioned a working distance from the interior surface of the separation chamber;
    a retainer rotatably supported by the bearing, wherein the auger extends through the retainer;
    a nut rotatably coupled to a threaded portion of the auger, wherein rotation of the nut moves the flute relative to the separation chamber to establish the working distance between the flute and the interior surface of the separation chamber; and
    at least one fastener coupling the nut to the retainer.

2. The deboning machine of claim 1, wherein the at least one fastener is a first fastener, the deboning machine further comprising a second fastener, wherein the first and second fasteners together couple the nut to the retainer.

3. The deboning machine of claim 2, wherein the nut defines a split therein, the deboning machine further comprising a third fastener that cooperates with the nut and traverses the split such that tightening of the third fastener radially compresses the nut about the threaded portion of the auger.

4. The deboning machine of claim 2, wherein the nut defines a slot therein and includes an inboard nut portion and an outboard nut portion on opposing sides of the slot, and wherein at least one of the first fastener and the second fastener traverses the slot and tightening of at least one of the first fastener and the second fastener compresses the nut to increase interference between the outboard nut portion and the threaded portion of the auger.

5. The deboning machine of claim 1, further comprising a tool shaped to cooperate with the retainer to rotate the retainer and the nut relative to the auger when the at least one fastener couples the nut to the retainer.

6. The deboning machine of claim 5, wherein the tool has a thickness and is adapted to maintain a gap between the nut and the retainer substantially equal to the thickness of the tool when the tool is positioned between the nut and the retainer, and wherein, when the tool is removed from between the nut and the retainer, the auger is adapted to move relative to the retainer to provide the working distance between the flute and the interior surface of the separation chamber.

7. The deboning machine of claim 6, wherein the tool is a first tool, the thickness is a first thickness, the gap is a first gap, and the working distance is a first working distance, the deboning machine further comprising:
    a second tool having a second thickness and adapted to maintain a second gap between the nut and the retainer substantially equal to the second thickness of the second tool when the second tool is positioned between the nut and the retainer;
    wherein the first tool and the second tool are interchangeably useable with the deboning machine; and
    wherein, when the second tool is removed from between the nut and the retainer, the auger is adapted to move relative to the retainer to provide a second working distance between the flute and the interior surface of the separation chamber, the second working distance being different than the first working distance.

8. The deboning machine of claim 5, wherein the tool includes indicia thereon, and wherein the indicia represents at least a portion of steps associated with a method of setting the working spacing between the auger and the separation chamber in the deboning machine.

9. A method of setting a working spacing between an auger and a separation chamber in a deboning machine, the method comprising:
   passing a threaded portion of the auger through a retainer that rotationally cooperates with a bearing;
   engaging a nut with the threaded portion of the auger;
   coupling the nut to the retainer;
   rotating the nut and the retainer to move the auger relative to the retainer in a first longitudinal direction until the auger engages the separation chamber; and
   moving the auger in a second longitudinal direction opposite the first longitudinal direction relative to the retainer to attain the working spacing between the auger and the separation chamber.

10. The method of claim 9, wherein coupling the nut to the retainer further comprises fastening the nut to the retainer with at least one fastener.

11. The method of claim 9, wherein coupling the nut to the retainer further comprises fastening the nut to the retainer with a first fastener and a second fastener.

12. The method of claim 11, wherein the nut defines a slot therein and includes an inboard nut portion and an outboard nut portion on opposing sides of the slot, and wherein at least one of the first fastener and the second fastener traverses the slot, the method further comprising tightening at least one of the first fastener and the second fastener to compress the nut and increase interference between the outboard nut portion and the threaded portion of the auger.

13. The method of claim 11, wherein the nut defines a split therein and a third fastener cooperates with the nut and traverses the split, the method further comprising tightening the third nut to radially compress the nut about the threaded portion of the auger.

14. The method of claim 9, wherein rotating the nut and the retainer further comprises rotating the nut and the retainer with a tool shaped to cooperate with the retainer.

15. The method of claim 14, wherein the tool has a thickness, the method further comprising:
   removing the tool from between the nut and the retainer after the auger engages the separation chamber to provide a gap between the nut and the retainer substantially equal to the thickness of the tool; and wherein
   moving the auger in a second longitudinal direction further comprises moving the auger in the second longitudinal direction a distance substantially equal to the gap provided by the thickness of the tool to attain the working spacing between the auger and the separation chamber.

16. The method of claim 15, wherein the tool is a first tool, the thickness is a first thickness, the gap is a first gap, and the working distance is a first working distance, the method further comprising:
   interchangeably engaging one of the first tool and a second tool with the retainer to rotate the nut and the retainer, the second tool having a second thickness and adapted to maintain a second gap between the nut and the retainer substantially equal to the second thickness of the second tool when the second tool is positioned between the nut and the retainer; and
   when the second tool is positioned between the nut and the retainer, the method further comprising:
   removing the second tool from between the nut and the retainer after the auger engages the separation chamber to provide the second gap between the nut and the retainer substantially equal to the second thickness of the second tool; and wherein
   moving the auger in a second longitudinal direction further comprises moving the auger in the second longitudinal direction a distance substantially equal to the second gap provided by the second thickness of the second tool to attain the second working spacing between the auger and the separation chamber.

17. The method of claim 9, further comprising positioning indicia on a tool used to rotate the nut and the retainer, wherein the indicia represents at least a portion of steps associated with the method of setting a working spacing between an auger and a separation chamber in a deboning machine.

* * * * *